United States Patent [19]

Newcombe et al.

[11] Patent Number: 4,865,076
[45] Date of Patent: Sep. 12, 1989

[54] VALVES FOR CONTROLLING WATER SUPPLY

[75] Inventors: Haydn J. Newcombe, Wolverhampton; Jeffrey C. Lowe, Tettenhall, both of England

[73] Assignee: Armitage Shanks Ltd., Rugeley, England

[21] Appl. No.: 218,920

[22] Filed: Jul. 14, 1988

[30] Foreign Application Priority Data

Aug. 28, 1987 [GB] United Kingdom ................. 8720431

[51] Int. Cl.⁴ ...................... F16K 31/04; F16K 11/20
[52] U.S. Cl. ................................ 137/602; 251/129.11
[58] Field of Search ....................... 251/129.11, 129.12

[56] References Cited

U.S. PATENT DOCUMENTS 3,505,888  4/1970  Denkowski ................. 251/129.11 X
4,763,874  8/1988  Ogawa ....................... 251/129.11 X Primary Examiner—Arnold Rosenthal
Attorney, Agent, or Firm—Learman & McCulloch

[57] ABSTRACT

Figure 2:
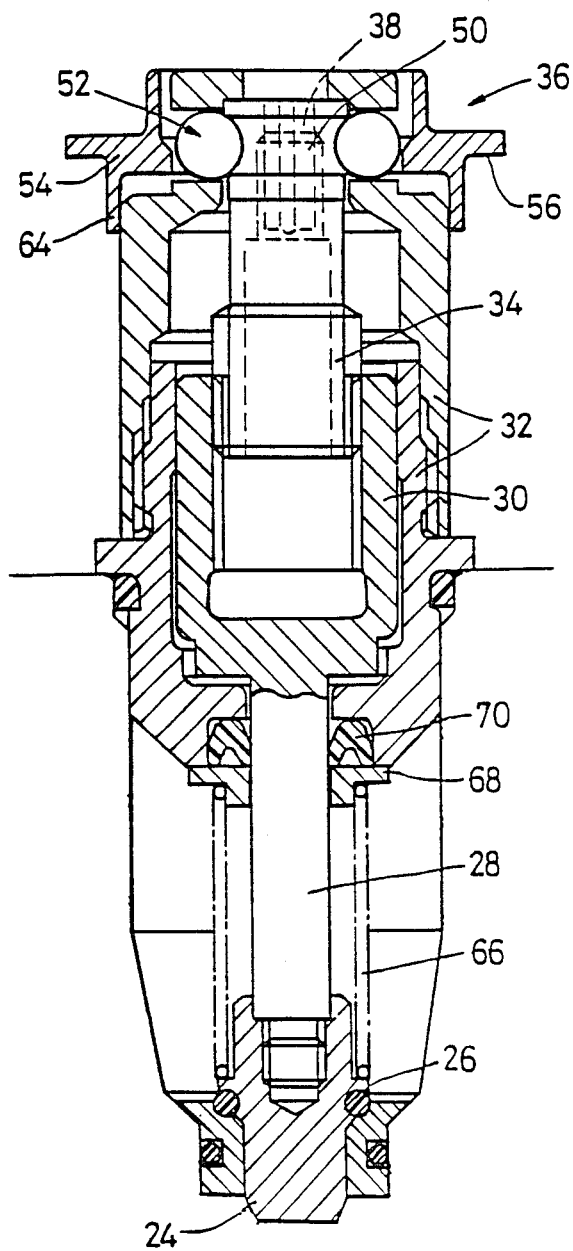

A motorized valve, FIG. 2, is provided with a solenoid operated clutch which is energized when the valve is in operation and which can be de-energized, for example on power failure to allow the valve to be instantaneously driven to a closed position. The valve has a motor with a non-circular shaft driving the screw of a screw and nut mechanism in which the nut carries the valve closure element, and the clutch comprises a plurality of balls carried by a cage and held in engagement with the screw by a clutch ring which is held in the operative position by the solenoid. De-energization of the solenoid allows the ring to be spring-driven allowing the balls to disengage from the groove and allowing the screw to be displaced out of the cage by the driving spring.

7 Claims, 5 Drawing Sheets

VALVES FOR CONTROLLING WATER SUPPLY

This invention relates to motorised valves for controlling the supply of water, where the closure element is driven between at least open and closed positions and possibly to a range of intermediate positions. A first problem arises in the event of a power failure which may leave such a valve in an undesirable open condition.

In some instances, separate motorised valves are used on hot and cold supplies to proportion flow so as to achieve a mixed output at a particular temperature. In the event of rapid variation in pressure or temperature in either supply, the motors may not be able to adjust one or other of the valves sufficiently quickly to avoid risk of thermal shock or even injury to a bather: This is a second problem. The conventional solution for this latter problem is a thermostatic element mechanically connected to a valve but usually this has a minimum reaction time which is undesirably slow.

The object of the invention is to solve these problems.

According to the invention a motorised valve for controlling the flow of water comprises a valve closure element which is movable axially relative to a valve seat, a motor having an angularly moveable shaft, and a screw and nut mechanism connecting the shaft and element, characterised in that a solenoid operated clutch is provided to couple the element to the shaft.

Preferably the clutch holds the parts together when the solenoid is energised, so that in the event of power failure the clutch disengages to allow substantially instantaneous closure of the valve for example under the influence of gravity, by a driving spring, or possibly utilising water pressure. In order to provide for a similar rapid closing under other circumstances, the solenoid may be connected to an appropriate electronic circuit including sensors for water temperature and pressure, so that if the temperature of a line, or possibly of both hot and cold lines, is either above or below certain preset limits, or possibly if the pressure in either line is above or below certain preset limits, a signal similarly de-energises the solenoid to the same effect.

When the solenoid is to be re-energised for any reason, the stem may be motor driven by the angularly fast coupling with the spindle so as to return it to the position for clutch engagement.

Figure 1:
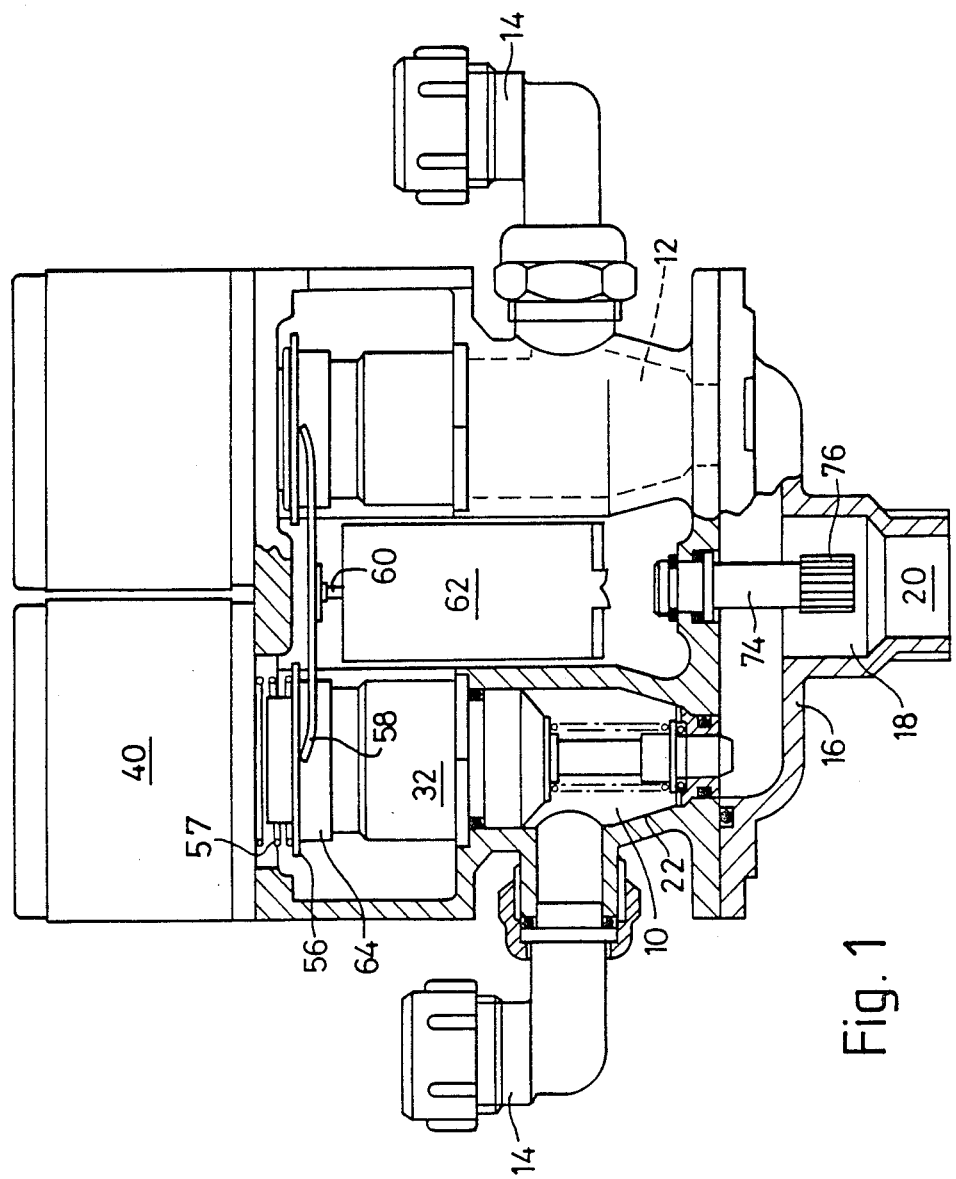

The invention is more particularly described with reference to the accompanying drawings wherein FIG. 1 is an elevation of a thermostatic mixing valve comprising a pair of motorised valves supplying respectively hot and cold water to a mixing chamber; and FIGS. 2–5 are sectional elevations on an enlarged scale showing one of the motorised valves in different positions.

Turning now to FIG. 1, the mixing valve shown has two separate chambers 10,12, each connected to a corresponding inlet 14 and to a manifold 16 of which the stem forms a mixing chamber 18 opening to a mixed water outlet 20. The manifold is generally Tee shaped in elevation as seen in the drawing, and the head of the Tee may be shaped to encourage vortex flow e.g. by each limb of the head of the Tee opening generally tangentially of the outlet 20 as seen in plan view. Each chamber houses a control valve. As the two chambers and control valves are identical, only one will be further described.

Figure 5:
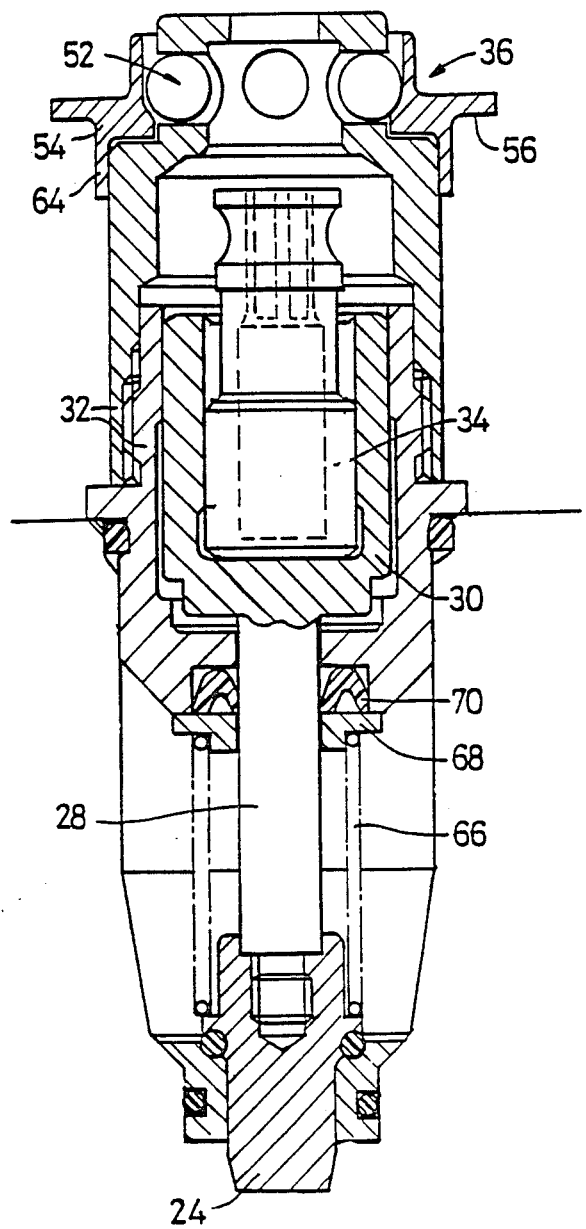

The chamber has a frusto-conical passage 22 narrowing towards the outlet 72, FIG. 5. Closure plug 24 (FIGS. 2–5) is to close the outlet and has an O ring seal 26 for this purpose. The arrangement and shape is such that the plug can be moved from the closed position to the fully open position through a range of intermediate positions which allow progressively greater flow rates. This is due to the relationship and spacing between the rim 80 at the lower end of the plug and the relatively shallow angle frusto-conical portion 82 of the chamber immediately adjacent the outlet 72. As the plug is moved away from the outlet, the cross sectional area available for flow increases progressively.

The plug is carried by a stem 28 fast with a nut 30 which is non-rotatable in a two-part housing 32, as by making the nut hexagonal and the housing of like shape in its interior. The nut 30 is engaged with a screw 34 which is held axially captive by a clutch 36. The screw has a non-circular bore 38 which is angularly fast with and in sliding engagement with the complementary drive shaft (not shown) of a stepping motor 40, FIG. 1.

The screw and nut may have any suitable screwthreads, for example multistart threads of appropriate profile, so that a rotation of the drive shaft in one or other direction causes the nut to rise or fall relative to the screw, when the screw is axially fixed.

Figure 3:
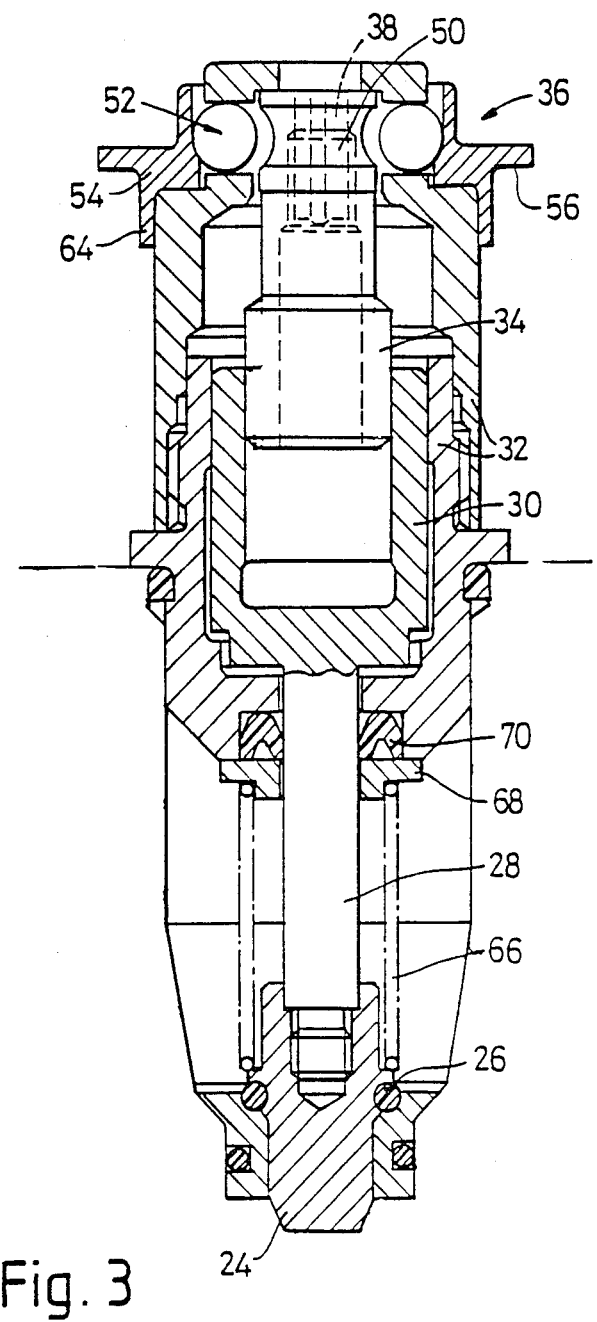
Figure 4:
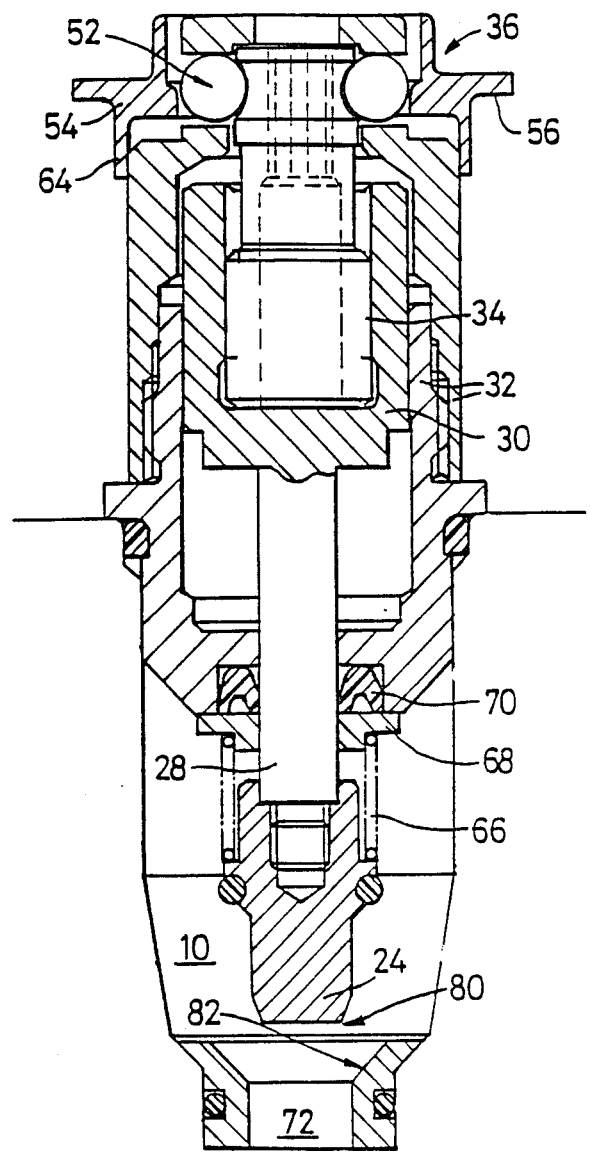

The clutch 36, which is for axially fixing the screw, comprises a hub 50 with a peripheral groove to engage clutch balls 52 which can move radially from the engaged position of FIG. 2, to the disengaged position of FIG. 3 under the control of a cam face on the interior of clutch ring 54 when the ring is moved axially between the positions seen in FIGS. 2 and 3. The ring has a radial flange 56 for actuation by fork 58, FIG. 1, carried by solenoid pin 60 arranged so that energisation of the solenoid 62 lifts the ring to the FIG. 2 position and engages the clutch, i.e. forces the balls radially inwards to engage in the groove and lock the screw 34 in position axially whilst leaving it free to rotate. A conical compression spring 57 is interposed between flange 56 and an opposite abutment, to keep the ring in contact with the fork.

The clutch ring 54 is guided for axial movement by collar 64 sliding on the housing 32.

The plug 24 and its stem 28 with the nut 30 are all urged by spring 66 which in this instance is a helical compression spring trapped between the plug and a collar 68 which also serves to locate a seal 70.

Certain parts of the cycle of operations can now be described. Assuming that water and power are connected to the valve and the valve is in the closed normal condition, a demand for water leads to the solenoid being energised to the FIG. 2 condition and to the stepping motor 40 being pulsed. Each pulse may turn the drive shaft through a small increment of the order of one or two degrees, turning the screw likewise, and moving the nut, stem and plug axially so as to open the valve. The flow rate depends upon the axial position as explained. A train of pulses take the parts to the fully open position of FIG. 4, or vice versa. The valve is to be (or may be) continually adjusted, as necessary, in conjunction with similar but not necessarily like or simultaneous adjustment of the second valve so as to produce the required temperature in the mixed flow.

If the temperature of one or other supply varies, adjustment of the valves position compensates for this. If either supply fails, the valve would ordinarily shut down as it becomes impossible to maintain the preset temperature. But shut-down time by rotation of the drive shaft inevitably takes time. However, a more rapid in fact almost instantaneous shut-down is provided by the solenoid clutch. De-energisation either as a result of power failure or a signal from the electronic control e.g. from temperature or pressure sensors results in pin 60 falling, taking with it fork 58 so as to allow the clutch ring 56 to follow. This moves from the FIG. 2 position to the FIG. 3 position: if the valve was open, then spring 66 displaces the screw and nut in whatever adjusted position they were in, to the FIG. 5 position. This is much more rapid than could possibly be achieved by any rotation of the drive shaft because it is accomplished by the spring driven sliding movement of the whole screw and nut relative to the drive shaft. Further, the illustrated design is such that the closing movement is sided by the water pressure, i.e. is also hydraulically actuated. Such de-energisation also terminates the train of pulses to the drive motor. However, the length of the drive shaft (not shown) is such that it remains in driving engagement with the screw even in the FIG. 5 position.

Upon re-energisation, the circuitry causes a train of pulses to the drive motor sufficient to rotate the shaft and return the screw from the FIG. 5 position to the FIG. 3 position before the solenoid is re-energised to move the clutch to the FIG. 2 position.

We claim:

1. A motorised valve for controlling the flow of liquid comprising a body having a chamber therein, a liquid inlet and a liquid outlet in communication with said chamber, a valve stem, a valve plug carried by said stem for opening and closing said outlet to enable and disable the flow of liquid through the chamber, a stepping motor, a drive shaft rotatable by said motor, a relatively rotatable screw and nut mechanism interconnecting said drive shaft and said valve stem and operable when said shaft relatively rotates the screw and nut mechanism to translate the turning into axial movement of the plug selectively toward and away from the outlet, said drive shaft being angularly fast but axially free with said screw and nut mechanism, a clutch for axially coupling and decoupling said drive shaft to and from the screw and nut mechanism, and a spring acting on said plug for driving the latter in a direction to close said outlet when the clutch decouples the drive shaft from the screw and nut mechanism.

2. A valve according to claim 1 wherein said plug forms an enlargement on said valve stem, and wherein said chamber forms a flow passage between said inlet and said outlet, said plug lying between said inlet and said outlet, whereby said plug may be hydraulically driven to its outlet closing position by said liquid.

3. A valve according to claim 1 wherein the drive shaft has a non-circular cross section, said screw has a complementary bore in which said shaft is slideably accommodated, said nut has a non-circular external shape, and said valve body has a portion of complementary shape in which said nut is received, whereby the nut is held angularly fast but is axially free therein, said nut being integral with said stem.

4. A valve according to claim 1 wherein said screw comprises a hub having a peripheral groove, and wherein said clutch comprises a plurality of balls located in said groove and a release ring axially displaceable relative to said screw to force said balls into and out of axial locking position in the hub.

5. A valve according to claim 4 including a solenoid operable to move said release ring in one direction and including spring means abutting said ring and operable to move the ring in the opposite direction.

6. A valve for mixing the flow of hot and cold liquids comprising a pair of motorised valves each as claimed in claim 1, the outlets of both of said chambers leading to a common mixing chamber.

7. In a motorised valve for controlling the flow of liquid comprising a motor, a drive shaft rotatably coupled to said motor, a valve plug, and a screw and nut mechanism normally connecting said drive shaft and valve plug whereby motor driven rotation of said drive shaft by said motor in one or other direction displaces the valve plug to open or close the valve and increase or decrease the flow of liquid through the valve, the improvement comprising axial position locaton means for locating said plug relative to said motor, said location means including a solenoid operated clutch adapted to disengage and free said location means, and spring means acting on said plug for driving said plug to a closed position when said location means is freed.

* * * * *